(12) United States Patent
Mashrouteh et al.

(10) Patent No.: US 11,866,032 B2
(45) Date of Patent: Jan. 9, 2024

(54) SYSTEM AND METHOD FOR CONTROLLING ELECTRONIC LIMITED SLIP DIFFERENTIAL AND ACTIVE AERODYNAMIC ACTUATOR ON VEHICLE

(71) Applicant: GM GLOBAL TECHNOLOGY OPERATIONS LLC, Detroit, MI (US)

(72) Inventors: Shamim Mashrouteh, Waterloo (CA); SeyedAlireza Kasaiezadeh Mahabadi, Novi, MI (US); Reza Hajiloo, Waterloo (CA); Seyedeh Asal Nahidi, North York (CA); Yubiao Zhang, Sterling Heights, MI (US); Bakhtiar B. Litkouhi, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 207 days.

(21) Appl. No.: 17/396,466

(22) Filed: Aug. 6, 2021

(65) Prior Publication Data
US 2023/0037307 A1 Feb. 9, 2023

(51) Int. Cl.
| | | |
|---|---|---|
| *B60W 30/02* | (2012.01) | |
| *B60W 10/16* | (2012.01) | |
| *B60W 10/30* | (2006.01) | |
| *B62D 37/02* | (2006.01) | |
| *F16H 48/34* | (2012.01) | |

(52) U.S. Cl.
CPC ............ *B60W 30/02* (2013.01); *B60W 10/16* (2013.01); *B60W 10/30* (2013.01); *B62D 37/02* (2013.01); *F16H 48/34* (2013.01); *B60W 2510/207* (2013.01); *B60W 2520/10* (2013.01); *B60W 2520/14* (2013.01); *B60W 2520/20* (2013.01); *B60W 2520/263* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 7,874,513 B1 * | 1/2011 | Smith ................... | B64C 11/001 244/12.4 |
| 2003/0094537 A1 * | 5/2003 | Austen-Brown ... | B64C 29/0033 244/7 R |

(Continued)

OTHER PUBLICATIONS

U.S. Appl. No. 17/124,664, filed Dec. 17, 2020, Yubiao Zhang et al.
(Continued)

*Primary Examiner* — Peter D Nolan
*Assistant Examiner* — Mikko Okechukwu Obioha

(57) ABSTRACT

A system includes a primary control module, a stability status module, and a supervisory control module. The primary control module is configured to determine at least one control action for at least one of an electronic limited slip differential and an aerodynamic actuator of a vehicle based on a driver command. The stability status module is configured to determine whether at least one component of the vehicle is stable or unstable based on an input from a sensor on the vehicle. The at least one component includes at least one of a vehicle body, a front axle, a rear axle, front wheels, and rear wheels. The supervisory control module is configured to adjust the at least one control action when the at least one component is unstable.

20 Claims, 7 Drawing Sheets

(52) U.S. Cl.
CPC ..... *B60W 2530/00* (2013.01); *B60W 2540/00* (2013.01); *B60W 2710/125* (2013.01); *B60W 2710/30* (2013.01)

(56) References Cited

U.S. PATENT DOCUMENTS

| | | | | |
|---|---|---|---|---|
| 2012/0043413 | A1* | 2/2012 | Smith | B64C 29/0033 |
| | | | | 244/12.4 |
| 2015/0105990 | A1* | 4/2015 | Chimner | B60T 8/1755 |
| | | | | 701/1 |
| 2018/0056743 | A1* | 3/2018 | Zhou | B64D 17/80 |
| 2018/0162223 | A1* | 6/2018 | Alfredson | B60K 17/16 |
| 2018/0290540 | A1* | 10/2018 | Tsuji | F16H 48/34 |
| 2020/0369331 | A1* | 11/2020 | Ferri | B62D 35/008 |
| 2022/0260145 | A1* | 8/2022 | Weston | F16H 48/34 |

OTHER PUBLICATIONS

U.S. Appl. No. 17/325,709, filed May 20, 2021, Yubiao Zhang et al.

* cited by examiner

SYSTEM AND METHOD FOR CONTROLLING ELECTRONIC LIMITED SLIP DIFFERENTIAL AND ACTIVE AERODYNAMIC ACTUATOR ON VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for controlling an electronic limited slip differential and an active aerodynamic actuator on a vehicle.

A differential transfers torque from an engine of a vehicle to left and right wheels of the vehicle. A limited slip differential allows the left and right wheels to rotate at different speeds while limiting the maximum difference between the speeds of the left and right wheels. An electronic slip differential (eLSD) includes an electronically controlled clutch that allows the left and right wheels to rotate at different speeds when the clutch is unlocked and rotates the left and right wheels at or near the same speed when the clutch is locked.

An active aerodynamic actuator is an actuator that is adjustable to adjust aerodynamic forces acting on a vehicle such as lift and drag. An example of an active aerodynamic actuator on an automotive vehicle is a wing mounted to a body of the vehicle at or near its front or rear end. The wing generates a downward force that is transmitted to the front or rear wheels of the vehicle. The attack angle of the wing is adjustable to adjust the amount of downward force generated by the wing.

SUMMARY

A system according to the present disclosure includes a primary control module, a stability status module, and a supervisory control module. The primary control module is configured to determine at least one control action for at least one of an electronic limited slip differential and an aerodynamic actuator of a vehicle based on a driver command. The stability status module is configured to determine whether at least one component of the vehicle is stable or unstable based on an input from a sensor on the vehicle. The at least one component includes at least one of a vehicle body, a front axle, a rear axle, front wheels, and rear wheels. The supervisory control module is configured to adjust the at least one control action when the at least one component is unstable.

In one aspect, the aerodynamic actuator includes a front wing attached to the vehicle body adjacent to a front end of the vehicle and a rear wing attached to the vehicle body adjacent to a rear end of the vehicle, the at least one control action includes a desired attack angle of the front wing and a desired attack angle of the rear wing, the supervisory control module is configured to adjust the desired attack angle of at least one of the front and rear wings when at least one of the vehicle body, the front and rear axles, and the front and rear wheels is unstable, and the supervisory control module is configured to not adjust the desired attack angle of either one of the front and rear wings when the vehicle body, the front and rear axles, and the front and rear wheels are stable.

In one aspect, the supervisory control module is configured to increase the desired attack angle of the front wing to increase a downward force on the front wheels of the vehicle, and to not adjust the desired attack angle of the rear wing, when any one of the following conditions is satisfied: the vehicle body is stable, the front axle is unstable, and the front and rear wheels are stable; the vehicle body is stable, the front axle is unstable, and the front wheels are unstable; and the vehicle body is stable, the front and rear axles are stable, and the front wheels are unstable.

In one aspect, the supervisory control module is configured to not adjust the desired attack angle of the front wing, and increase the desired attack angle of the rear wing to increase a downward force on the rear wheels of the vehicle, when any one of the following conditions is satisfied: the vehicle body is stable, the rear axle is unstable, and the front and rear wheels are stable; the vehicle body is stable, the rear axle is unstable, and the rear wheels are unstable; and the vehicle body is stable, the front and rear axles are stable, and the rear wheels are unstable.

In one aspect, the supervisory control module is configured to decrease the desired attack angle of the front wing to decrease a downward force on the front wheels of the vehicle, and increase the desired attack angle of the rear wing to increase a downward force on the rear wheels of the vehicle, when any one of the following conditions is satisfied: the vehicle body is unstable; the vehicle body is stable, the front axle is unstable, and the rear wheels are unstable; and the vehicle body is stable, the rear axle is unstable, and the front wheels are unstable.

In one aspect, the at least one control action includes whether to activate the electronic limited slip differential to transfer torque from one of the rear wheels to the other one of the rear wheels, and the supervisory control module is configured to one of activate and deactivate the electronic limited slip differential based on whether the vehicle body, the front and rear axles, and the front and rear wheels are stable.

In one aspect, the at least one control action further includes whether to activate a front wing to generate a downward force on the front wheels of the vehicle and whether to activate a rear wing to generate a downward force on the rear wheels of the vehicle, and the supervisory control module is configured to one of activate and deactivate the front and rear wings based on whether the vehicle body, the front and rear axles, and the front and rear wheels are stable.

In one aspect, the supervisory control module is configured to deactivate the front wing and the electronic limited slip differential and activate the rear wing when any one of the following conditions is satisfied: the vehicle body is stable and oversteering, the front and rear axles are stable, at least one of the front and rear wheels is unstable, and an inner wheel speed of is greater than an outer wheel speed of the vehicle; the vehicle body is stable and oversteering, at least one of the front and rear axles is unstable, and the inner wheel speed of the rear axle is greater than the outer wheel speed of the rear axle; the vehicle body is unstable, the front and rear axles are stable, at least one of the front and rear wheels is unstable, and the inner wheel speed of the vehicle is greater than the outer wheel speed of the vehicle; the vehicle body is unstable and oversteering, at least one of the front and rear axles is unstable, and the inner wheel speed of the rear axle is greater than the outer wheel speed of the rear axle; the vehicle body is unstable and oversteering, at least one of the front and rear axles is unstable, and the inner wheel speeds of the front and rear axles are greater than the outer wheel speeds of the front and rear axles, respectively;

and the vehicle body is unstable and oversteering, at least one of the front and rear axles is unstable, and the inner wheel speed of one of the front and rear axles is greater than the outer wheel speed of the same one of the front and rear axles.

In one aspect, the supervisory control module is configured to activate the front wing and the electronic limited slip differential and deactivate the rear wing when any one of the following conditions is satisfied: the vehicle body is stable and understeering, the front and rear axles are stable, and an inner wheel speed of one of the front and rear axles is greater than an outer wheel speed of the same one of the front and rear axles; and the vehicle body is stable and understeering, at least one of the front and rear axles is unstable, and the inner wheel speed of the rear axle is greater than the outer wheel speed of the rear axle.

In one aspect, the supervisory control module is configured to deactivate the front wing and activate the rear wing and the electronic limited slip differential when any one of the following conditions is satisfied: the vehicle body is stable and oversteering, the front and rear axles are stable, and the front and rear wheels are stable; the vehicle body is stable and oversteering, the front and rear axles are stable, at least one of the front and rear wheels is unstable, and an outer wheel speed of the vehicle is greater than an inner wheel speed of the vehicle; the vehicle body is stable and oversteering, at least one of the front and rear axles is unstable, and the outer wheel speed of one of the front and rear axles is greater than the inner wheel speed of the same one of the front and rear axles; the vehicle body is stable and oversteering, the rear axle is unstable, and the front and rear wheels are stable; and the vehicle body is unstable and oversteering, at least one of the front and rear axles is unstable, and the outer wheel speed of one of the front and rear axles is greater than the inner wheel speed of the same one of the front and rear axles.

In one aspect, the supervisory control module is configured to activate the front wing and deactivate the rear wing and the electronic limited slip differential when any one of the following conditions is satisfied: the vehicle body is stable and understeering, the front and rear axles are stable, and the front and rear wheels are stable; the vehicle body is stable and understeering, the front and rear axles are stable, at least one of the front and rear wheels is unstable, and an outer wheel speed of the vehicle is greater than an inner wheel speed of the vehicle; the vehicle body is stable and understeering, at least one of the front and rear axles is unstable, and the outer wheel speed of one of the front and rear axles is greater than the inner wheel speed of the same one of the front and rear axles; and the vehicle body is stable and understeering, the front axle is unstable, and the front and rear wheels are stable.

In one aspect, the stability status module is configured to determine whether the vehicle body is stable based on a yaw rate of the vehicle, a sideslip angle of the vehicle, and a longitudinal speed of the vehicle, and the supervisory control module is configured to adjust the at least one control action when the vehicle body is unstable.

In one aspect, the stability status module is configured to determine whether the front and rear axles are stable based on tire sideslip angles of the front and rear wheels, and the supervisory control module is configured to adjust the at least one control action when the at least one of the front and rear axles is unstable.

In one aspect, the stability status module is configured to determine whether the front and rear wheels are stable based on tire slip ratios of the front and rear wheels, and the supervisory control module is configured to adjust the at least one control action when the at least one of the front and rear wheels is unstable.

In one aspect, the system further includes a desired vehicle dynamics module configured to determine a desired value of a vehicle dynamics characteristic based on the driver command, and the primary control module is configured to determine the at least one control action based on the desired value of the vehicle dynamics characteristic using a vehicle dynamics model.

In one aspect, the primary control module is configured to predict an actual value of the vehicle dynamics characteristic corresponding to possible values of the at least one control action using the vehicle dynamics model, determine a cost associated with each of the possible values based on a difference between the predicted and desired values of the vehicle dynamics characteristic, and set the control action equal to the one of the possible values with the lowest cost out of all of the possible values.

Another system according to the present disclosure includes a desired vehicle dynamics module, a desired vehicle dynamics module, a primary control module, a stability status module, and a supervisory control module. The desired vehicle dynamics module is configured to determine a desired value of a vehicle dynamics characteristic based on a driver command. The primary control module is configured to determine control actions for an electronic limited slip differential, a front wing, and a rear wing based on the desired value of the vehicle dynamics characteristic using a vehicle dynamics model. The stability status module is configured to determine whether a vehicle body, a front axle, a rear axle, front wheels, and rear wheels are stable based on an input from a sensor on the vehicle. The supervisory control module is configured to adjust at least one the control actions when at least one of the front axle, the rear axle, the front wheels, and the rear wheels is unstable.

In one aspect, the control actions include whether to activate the electronic limited slip differential to transfer torque from one of the rear wheels to the other one of the rear wheels, whether to activate the front wing to generate a downward force on the front wheels of the vehicle, and whether to activate the rear wing to generate a downward force on the rear wheels of the vehicle, and the supervisory control module is configured to one of activate and deactivate the electronic limited slip differential and the front and rear wings based on whether the vehicle body, the front and rear axles, and the front and rear wheels are stable.

In one aspect, the stability status module is configured to determine whether the vehicle body is stable based on a yaw rate of the vehicle, a sideslip angle of the vehicle, and a longitudinal speed of the vehicle, determine whether the front and rear axles are stable based on tire sideslip angles of the front and rear wheels, and determine whether the front and rear wheels are stable based on tire slip ratios of the front and rear wheels, and the supervisory control module is configured to adjust the at least one control action when at least one of the vehicle body, the front and rear axles, and the front and rear wheels is unstable.

In one aspect, the primary control module is configured to predict an actual value of the vehicle dynamics characteristic corresponding to possible values of each of the control actions using the vehicle dynamics model, determine a cost associated with each of the possible values based on a difference between the predicted and desired values of the vehicle dynamics characteristic, and set the control actions equal to the set of the possible values with the lowest cost out of all sets of the possible values.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
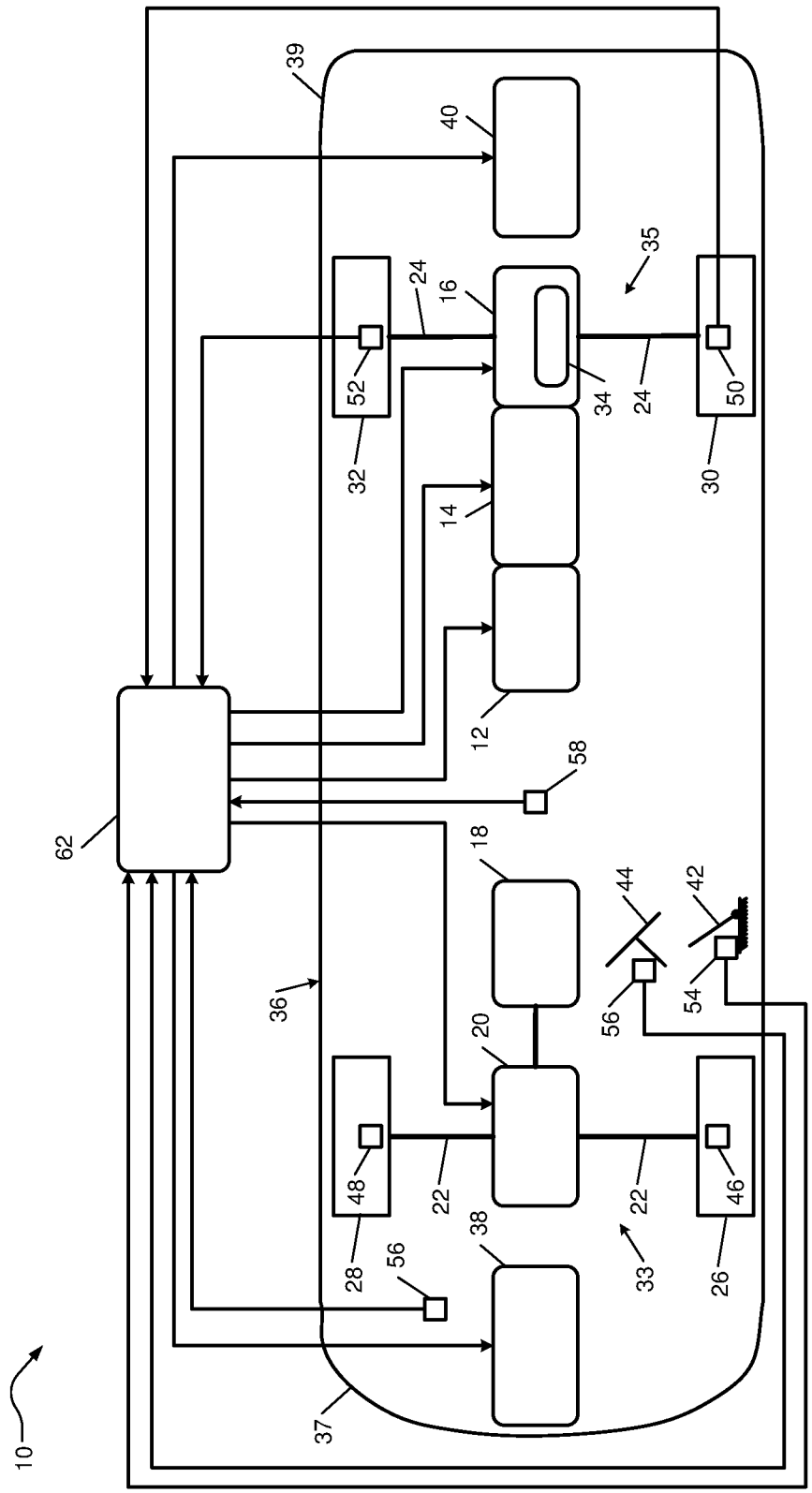
FIG. 1 is a functional block diagram of an example vehicle system according to the present disclosure.

A vehicle control system may control multiple actuators of a vehicle, such as an eLSD and an active aerodynamic actuator, using a multiple input, multiple output control technique such as model predictive control (MPC). When controlling the actuators using MPC, the vehicle control system predicts vehicle responses to numerous possible control actions for each actuator using a prediction model that relates actuator control actions to vehicle responses. The vehicle control system then determines a cost of a set of possible control actions for the actuators using a cost function that relates the control actions to the cost. The cost is a measure of a difference between the predicted vehicle responses and desired vehicle responses. The vehicle control system then selects the control action of each actuator that yields the lowest cost, and controls the actuators using the selected control actions.

The predicted vehicle responses typically include state variables, such as vehicle performance parameters, and control outputs, such as a force or torque generated by an actuator in response to an actuator command. For example, the state variables may include parameters related to the stability of the vehicle (e.g., body, axle, wheels) if MPC is used to maintain vehicle stability. The prediction accuracy of the state variables and the control outputs are affected by the accuracy of the prediction model and estimated inputs. Thus, if the prediction model and/or the estimated inputs is/are inaccurate, the control actions calculated using MPC may be adversely affected and may not necessarily assist with maintaining vehicle stability.

In addition, conflict between the control actions may result in miscalculation optimization variables used by MPC and thereby inhibit maintaining vehicle stability. While additional terms may be included in the cost function to overcome miscalculations in control actions, doing so may adversely affect tracking efficiency by reducing the focus of the optimization from the main objective. Furthermore, including such additional terms requires time-consuming tunings to ensure that the actuators do not counteract the effects of one another that achieve the objectives.

A vehicle control system according to the present disclosure includes a primary control module that calculates control actions and a supervisory control module that determines whether calculated control actions will maintain vehicle stability. If the calculated control actions will not maintain vehicle stability, the supervisory control module modifies the control actions in real-time to maintain vehicle stability. In one example, the primary control module calculates the control actions using MPC, and the supervisory control module adjusts optimization constraints used in MPC such that MPC does not allow control inputs that yield vehicle instability. The supervisory control module has a logic-based structure that allows managing an integrated control system to obtain at least sub-optimal control actions. The logic-based structure yields the desired effect of each control action, which is especially beneficial for actuators with complex, nonlinear mathematical models that may not have a direct effect on the state variables.

Referring now to FIG. 1, a vehicle 10 includes an engine 12, a transmission 14, an eLSD 16, a battery 18, an electric motor 20, front half shafts 22, rear half shafts 24, a left front wheel 26, a right front wheel 28, a left rear wheel 30, and a right rear wheel 32. The engine 12 combusts a mixture of air and fuel to produce drive torque. The transmission 14 transfers torque from the engine 12 to the eLSD 16 at one of a plurality of different gear ratios.

The eLSD 16 transfers torque from the transmission 14 to the left and right rear wheels 30 and 32 through the rear half shafts 24. The battery 18 supplies power to the electric motor 20. The electric motor 20 rotates the left and right front wheels 26 and 28 through the front half shafts 22. The front half shafts 22 and the left and right front wheels 26 and 28 collectively form a front axle 33 of the vehicle 10.

The eLSD 16 includes a clutch 34 that transfers torque from the left rear wheel 30 to the right rear wheel 32 and vice versa. The pressure of hydraulic fluid supplied to the clutch 34 may be adjusted to adjust the amount of torque transferred by the clutch 34 from the left rear wheel 30 to the right rear wheel 32 and vice versa. When the clutch 34 is unlocked, the eLSD 16 allows the left and right rear wheels 30 and 32 to rotate at different speeds while limiting the maximum difference between the speed of the left and right rear wheels 30 and 32. When the clutch 34 is locked, the eLSD 16 drives the left and right rear wheels 30 and 32 at the same speed or nearly the same speed. The eLSD 16, the rear half shafts 24, and the right and left rear wheels 30 and 32 collectively form a rear axle 35 of the vehicle 10.

The vehicle 10 further includes a vehicle body 36, a front wing 38, a rear wing 40, an accelerator pedal 42, and a steering wheel 44. The front end of the vehicle body 36 forms a front end 37 of the vehicle 10 and the rear end of the vehicle body 36 forms a rear end 39 of the vehicle 10. The front wing 38 is attached to the vehicle body 36 at or adjacent to the front end 37 of the vehicle 10. The rear wing 40 is attached to the vehicle body 36 at or adjacent to the rear end 39 of the vehicle 10.

The angle of attack of the front wing 38 may be adjusted so that airflow passing over the front wing 38 generates a downward force on the front end 37 of the vehicle 10, which is transmitted to the front wheels 26, 28. Similarly, the angle of attack of the rear wing 40 may be adjusted so that airflow passing over the rear wing 40 generates a downward force on the rear end 39 of the vehicle 10, which is transmitted to the rear wheels 30, 32. The front and rear wings 38 and 40 are referred to herein as front and rear (active) aerodynamic actuators, respectively.

A driver of the vehicle 10 depresses the accelerator pedal 42 to accelerate the vehicle 10. The driver rotates the steering wheel 44 to turn the vehicle 10. The vehicle 10 may also include a brake pedal (not shown) that the driver depresses to decelerate or stop the vehicle 10. In various implementations, the vehicle 10 may be an autonomous vehicle, in which case the accelerator pedal 42, the steering wheel 44, and the brake pedal may be omitted and/or an autonomous driver module (not shown) may control the acceleration, steering, and braking of the vehicle 10.

The vehicle 10 further includes a left front wheel speed sensor 46, a right front wheel speed sensor 48, a left rear wheel speed sensor 50, a right rear wheel speed sensor 52, an accelerator pedal position sensor 54, a steering wheel angle sensor 56, a vehicle motion sensor 58, a global positioning system (GPS) receiver or module 60, and a vehicle control module 62. The left front wheel speed sensor 46 measures the speed of the left front wheel 26 and generates a signal indicating the left front wheel speed. The right front wheel speed sensor 48 measures the speed of the right front wheel 28 and generates a signal indicating the right front wheel speed. The left rear wheel speed sensor 50 measures the speed of the left rear wheel 30 and generates a signal indicating the left rear wheel speed. The right rear wheel speed sensor 54 measures the speed of the right rear wheel 32 and generates a signal indicating the right rear wheel speed.

The accelerator pedal position sensor 54 measures the position of the accelerator pedal 42 and generates a signal indicating the accelerator pedal position. The steering wheel position sensor 56 measures the position of the steering wheel and generates a signal indicating the steering wheel position.

The vehicle motion sensor 58 measures the longitudinal (fore-aft) acceleration of the vehicle 10, the lateral (side-to-side) acceleration of the vehicle 10, and the yaw rate of the vehicle 10. The vehicle motion sensor 58 may be an inertial measurement unit, which may include accelerometers that measure the longitudinal and lateral vehicle acceleration and a gyroscope the measures the vehicle yaw rate. The vehicle motion sensor 58 generates a signal indicating the longitudinal vehicle acceleration, the lateral vehicle acceleration, and the vehicle yaw rate.

The GPS module 60 determines the geographic location of the vehicle 10 based on information indicated by signals received from global navigation satellite system (GNSS) satellites. The GPS module 60 may use the vehicle location to determine the speed of the vehicle 10. The GPS module 60 generates a signal indicating the vehicle location and the vehicle speed (if determined).

The vehicle control module 62 controls the engine 12, the transmission 14, the eLSD 16, the electric motor 20, the front wing 38, and the rear wing 40 based on inputs from the sensors of the vehicle 10. In one example, the vehicle control module 62 determines a driver command based on the sensor inputs, determines a desired vehicle dynamics characteristic based on the driver command, and determines a control action based on the desired vehicle dynamics characteristic. In another example, the vehicle control module 62 determines whether the vehicle body 36, the front and rear axles 33 and 35, and the wheels 26, 28, 30, 32 are stable (or unsaturated) or unstable (or saturated), and adjusts the control actions if one or more of the aforementioned components is/are unstable (or saturated).

Figure 2:
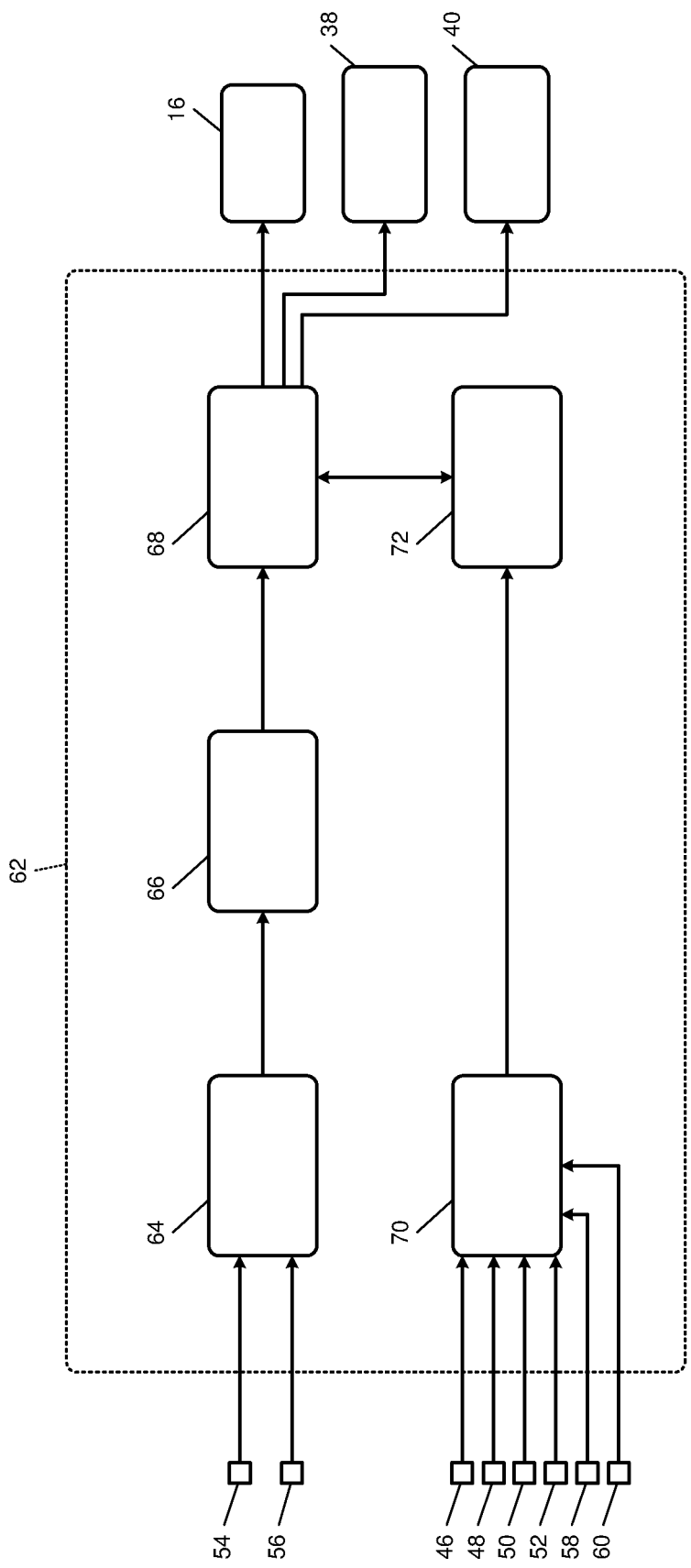
FIG. 2 is a functional block diagram of an example vehicle control module according to the present disclosure.

Referring now to FIG. 2, an example implementation of the vehicle control module 62 includes a driver command module 64, a desired vehicle dynamics module 66, a primary control module 68, a stability status module 70, and a supervisory control module 72. The driver command module 64 determines one or more driver commands such as a driver torque request and a steering angle. In one example, the driver command module 64 determines the driver torque request based on the accelerator pedal position from the accelerator pedal position sensor 54. In another example, the driver command module 64 determines the steering angle based on the steering wheel position from the steering wheel position sensor 56. The driver command module 64 outputs the driver commands.

The desired vehicle dynamics module 66 determines one or more desired vehicle dynamics characteristics of the vehicle 10 based on the driver commands. In one example, the desired vehicle dynamics module 66 determines a desired yaw rate of the vehicle 10, a desired sideslip angle of the vehicle 10, and desired tire forces of the vehicle 10 based on the driver torque request and the steering angle. The desired vehicle dynamics module 66 may accomplish this using a function or mapping that relates the driver torque request and the steering angle to the desired yaw rate, the desired sideslip angle, and the desired tire forces. The desired tire forces may include a desired longitudinal force, a desired lateral force, and a desired vertical force at each of the front and rear wheels 26, 28 and 30, 32. The desired vehicle dynamics module 66 outputs the desired vehicle dynamics characteristics.

The primary control module 68 determines control actions for the eLSD 16, the front wing 38, and the rear wing 40 based on the desired vehicle dynamics characteristics. The primary control module 68 may accomplish this using a vehicle dynamics model that relates the desired vehicle dynamics to the control actions. In one example, the control actions include whether to activate the eLSD 16 (e.g., apply the clutch 34) to transfer torque from one of the rear wheels 30, 32 to the other one of the rear wheels 30, 32, or to deactivate the eLSD 16. Additionally or alternatively, the control actions may include a requested amount of torque to be transferred by the eLSD 16.

In another example, the control actions include whether to activate the front wing 38 (e.g., adjust the attack angle thereof) to generate a downward force on the front wheels 26, 28, or to deactivate the front wing 38. Additionally or alternatively, the control actions may include a requested attack angle of the front wing 38. In another example, the control actions include whether to activate the rear wing 40 (e.g., adjust the attack angle thereof) to generate a downward force on the rear wheels 30, 32, or to deactivate the rear wing 40. Additionally or alternatively, the control actions may include a requested attack angle of the rear wing 40.

The primary control module 68 may conjunctively determine the control actions for the eLSD 16, the front wing 38, and the rear wing 40 using a multiple input, multiple output technique such as model predictive control (MPC). In one example, the primary control module 68 uses a feedforward approach to estimate an initial desired downward force to be generated by each of the front and rear wings 38 and 40. The primary control module 68 then uses a feedback approach to adjust the initial desired downward forces to be generated by the front and rear wings 38 and 40, if necessary, in order to track a desired yaw rate. The supervisory control module 72 then adjusts the control actions of the primary control module 68 based on input from the sensors of the vehicle 10 and the stability status module 70.

In the feedforward approach, the primary control module 68 determines the control actions using a cost function such as $$J(U) = \underbrace{\|y_t(u_t) - y_t^{Ref}\|_{W_1}^2}_{\text{motion error term}} + \underbrace{\|u_t - u_t^{Ref}\|_{W_2}^2}_{\text{control action error}} + \underbrace{\|T_{fl_t} + T_{fr_t} + T_{rl_t} + T_{rr_t} - T_{driver_t}^{Ref}\|_{W_3}^2}_{\text{total torque error}}, \quad (1)$$

where J is the cost of a set of control actions U, $u_t$ is a possible control action (e.g., a downward force generated by the front or rear wing 38 or 40) at a time t, $u_t^{Ref}$ is a reference (e.g., predetermined) control action at the time t, $y_t$ is an expected output (e.g., a yaw rate) of the control action $u_t$, $y_t^{Ref}$ is a reference output at the time t, $T_{fl_t}$, $T_{fr_t}$, $T_{rl_t}$, and $T_{rr_t}$ are the expected torques at the left front wheel 26, the right front wheel 28, the left rear wheel 30, and the right rear wheel 32, respectively, at the time t, $T_{driver_t}^{Ref}$ is the driver torque request at the time t, and $W_1$, $W_2$, $W_3$ are weights. Relationship (1) is subject to the constraint that the control action(s) is/are within a range from a minimum control action to a maximum control action. The primary control module 68 determines the cost of multiple (e.g., all) control actions within this range, and selects the control action that yields the lowest cost out of these control actions.

In the feedback approach, the primary control module 68 determines the control actions using a cost function such as $$J(x(t), U) = \sum_{k=1}^{p} \underbrace{\|y_{t+k,t} - y_{t+k,t}^{Ref}\|_{W_1}^2}_{\text{motion error term}} + \sum_{k=1}^{p-1} \underbrace{\|u_{t+k,t} - u_{t+k,t}^{Ref}\|_{W_2}^2}_{\text{control action error}} + \underbrace{\|\Delta u_{t+k,t} - \Delta u_{t+k,t}^{Ref}\|_{W_3}^2}_{\text{control action variation error}} + \underbrace{\|T_{fl_{t+k,t}} + T_{rl_{t+k,t}} + T_{rr_{t+k,t}} - T_{driver_{t+k,t}}^{ref}\|_{W_4}^2}_{\text{total torque error}}, \quad (2)$$

where J is the cost of a function x(t) and the control action set U, $y_{t+k,t}$ is a predicted output in a control or prediction horizon that includes the time t and a future time t+1, $y_{t+k,t}^{Ref}$ is a reference output in the prediction horizon, $u_{t+k,t}$ is a possible control action in the prediction horizon, $u_{t+k,t}^{Ref}$ is a reference control action in the prediction horizon, $\Delta u_{t+k,t}$ is a possible control action variation in the prediction horizon, $\Delta u_{t+k,t}^{Ref}$ is a reference control action variation in the prediction horizon, $T_{f_{t+k,t}}$, $T_{rl_{t+k,t}}$, and $T_{rr_{t+k,t}}$ are the expected torques at the front axle 33, the left rear wheel 30, and the right rear wheel 32, respectively, in the prediction horizon, $T_{driver_{t+k,t}}^{Ref}$ is the driver torque request in the prediction horizon, and $W_1$, $W_2$, $W_3$, $W_4$ are weights. Relationship (2) is subject to the constraint that the control action is within a range from the minimum control action to the maximum control action. The primary control module 68 determines the cost of multiple (e.g., all) control actions within this range, and selects the control action that yields the lowest cost out of these control actions. Relationship (2) is also subject to a constraint embodied in the following relationship:

$$x_{t+k+1,t} = Ax_{t+k,t} + Bu_{t+k,t} + W, \quad (3)$$

where k includes a set of integers from 0 to N−1, $x_0$ is equal to x(t), and A, B, and W may be constants in the prediction horizon and/or updated each time step.

The primary control module 68 uses a prediction model to predict the control outputs in the prediction horizon. The prediction model may be represented in state-space form as follows:

$$\dot{x} = Ax + Bu + d \quad (4)$$

$$y = Cx,$$

where u is the control variables, y is the control outputs, and A, B, C, and d may be constants in the prediction horizon and/or updated each time step. The control variables may be represented as follows:

$$u = [\Delta \varepsilon_{zf} \Delta \varepsilon_{zr}]^T, \quad (5)$$

where $\Delta \varepsilon_{zf}$ and $\Delta \varepsilon_{zr}$ are variations in angles of aerodynamic surfaces on the front and rear wings 38 and 40, respectively. The control outputs may be represented as follows:

$$y = [\beta r]^T, \quad (6)$$

where β is the sideslip angle of the vehicle 10 and r is the yaw rate of the vehicle 10.

The primary control module 68 may determine the desired outputs using a relationship such as $$y_{des} = [\beta_{des} r_{des}]^T, \quad (7)$$

where $y_{des}$ is the desired outputs, $\beta_{des}$ is the desired sideslip angle, and $r_{des}$ is the desired yaw rate. The desired yaw rate may be obtained using a relationship such as $$r_{des} = \text{sign}(r_{ss}) \min(|r_{ss}|, |a_{y,max}|), \quad (8)$$

where $r_{ss}$ is a steady-state yaw rate and $a_{y,max}$ is a maximum lateral acceleration. The desired sideslip angle may be obtained using a relationship such as $$\beta_{des} = \text{sign}(\beta_{ss}) \min(|\beta_{ss}|, |\beta_{max}|), \quad (9)$$

where $\beta_{ss}$ is a steady-state sideslip angle and $\beta_{max}$ is a maximum sideslip angle. The steady-state yaw rate may be obtained using a relationship such as $$r_{ss} = \frac{v_x}{l + k_{us} v_x^2} \delta, \quad (10)$$

where $k_{us}$ is an understeer tire slip ratio and δ is the steering angle of the vehicle 10. The steady-state sideslip angle may be obtained using a relationship such as $$\beta_{ss} = \frac{l_r - m l_f v_x^2 / 2 l C_{\alpha r}}{l + k_{us} v_x^2} \delta, \quad (11)$$

where $l_f$ is the distance from the center of gravity of the vehicle 10 to the front axle 33, $l_r$ is the distance from the center of gravity of the vehicle 10 to the rear axle 35, l is the distance between the front and rear axles 33 and 35, m is the total mass of the vehicle 10, and $c_\alpha$ is the tire cornering stiffness. The distances l, $l_f$, and $l_r$, the total mass m, and the tire cornering stiffness $c_\alpha$ may be predetermined.

The primary control module 68 may include actuator dynamics in the prediction model using a relationship such as $$\begin{bmatrix} \Delta\dot{\varepsilon}_{zf} \\ \Delta\dot{\varepsilon}_{zr} \end{bmatrix} = \begin{bmatrix} -\frac{1}{\tau_z} & 0 \\ 0 & -\frac{1}{\tau_z} \end{bmatrix} \begin{bmatrix} \Delta\varepsilon_{zf} \\ \Delta\varepsilon_{zr} \end{bmatrix} + \begin{bmatrix} \frac{1}{\tau_z} & 0 \\ 0 & \frac{1}{\tau_z} \end{bmatrix} \begin{bmatrix} \Delta\varepsilon_{zf,in} \\ \Delta\varepsilon_{zr,in} \end{bmatrix}, \quad (12)$$

where $\Delta\dot{\varepsilon}_{zf}$ and $\Delta\dot{\varepsilon}_{zr}$ are the change rates of the angles of the front and rear wings 38 and 40, respectively, $T_z$ is the actuator delay time (e.g., 500 milliseconds), and $\Delta\varepsilon_{zf,in}$ and $\Delta\varepsilon_{zr,in}$ are the input (or desired) angles of the front and rear wings 38 and 40, respectively. Relationship (12) can be represented as $$\dot{x}_u = A_u x_u + B_u u_{in},$$

where each term in the equation immediately above corresponds to the term in the same position in the first equation listed in this paragraph. The primary control module 68 may integrate the actuator dynamics in the prediction model to obtain the following relationship:

$$\begin{cases} \begin{bmatrix} \dot{x} \\ \dot{x}_u \end{bmatrix} = \underbrace{\begin{bmatrix} A & B \\ 0 & A_u \end{bmatrix}}_{\overline{A}} \begin{bmatrix} x \\ x_u \end{bmatrix} + \underbrace{\begin{bmatrix} 0 \\ B_u \end{bmatrix}}_{\overline{B}} u_{in} + \underbrace{\begin{bmatrix} d \\ 0 \end{bmatrix}}_{\overline{d}} \\ Y = \underbrace{[C \ 0]}_{\overline{C}} \begin{bmatrix} x \\ x_u \end{bmatrix} \end{cases} \quad (13)$$

where A, B, and x are estimates corresponding to $A_u$, $B_u$, and $x_u$, respectively, and C and d may be constants in the prediction horizon and/or updated each time step. Relationship (13) can be represented in continuous time as $$\begin{cases} \dot{X} = \overline{A}X + \overline{B}u_{in} + \overline{d} \\ Y = \overline{C}X \end{cases},$$

and relationship (13) can be represented in discrete time as $$\begin{cases} X_{k+1} = \overline{A}_d X_k + \overline{B}_d u_{in,k} + \overline{d}_d \\ Y_k = \overline{C}_d X_k \end{cases}.$$

The primary control module 68 may define the input increment $\Delta u_{in}$ as a new state to the integrated state-space model to obtain the following relationship:

$$\begin{cases} X_{u,k+1} = X_{u,k} + \Delta u_{in,k} \\ \Delta u_{in,k} = u_{in,k} - u_{in,k-1} \end{cases}. \quad (14)$$

The primary control module 68 may integrate the input increment $\Delta u_{in}$ into the state-space as follows:

$$\begin{cases} \begin{bmatrix} X_{k+1} \\ X_{u,k+1} \end{bmatrix} = \begin{bmatrix} \overline{A}_d & \overline{B}_d \\ 0 & I \end{bmatrix} \begin{bmatrix} X_k \\ X_{u,k} \end{bmatrix} + \begin{bmatrix} \overline{B}_d \\ 0 \end{bmatrix} \Delta u_{in,k} + \begin{bmatrix} \overline{d}_d \\ 0 \end{bmatrix} \\ Y_k = [\overline{C}_d \ 0] \begin{bmatrix} X_k \\ X_{u,k} \end{bmatrix} \end{cases} \quad (15)$$

where the input increment $\Delta u_{in}$ is subject to the constraint that it is greater than or equal to a minimum input increment $\Delta u_{in}^{min}$ and less than or equal to a maximum input increment $\Delta u_{in}^{max}$, and the amplitude $u_{in}$ of the control inputs is subject to the constraint that it is greater than or equal to a minimum amplitude $\Delta u_{in}^{min}$ and less than or equal to a maximum amplitude $\Delta u_{in}^{max}$.

The primary control module 68 may quantify the predicted error using a cost function such as $$J(x(t), U) = \underbrace{\sum_{k=1}^{p} \left\| y_{t+k,t} - y_{t+k,t}^{Ref} \right\|_{W_1}^2}_{\text{motion error term}} + \underbrace{\sum_{k=0}^{p-1} \left\| u_{t+k,t} - u_{t+k,t}^{Ref} \right\|_{W_2}^2}_{\text{control action error}} + \underbrace{\left\| \Delta u_{t+k,t} - \Delta u_{t+k,t}^{Ref} \right\|_{W_3}^2}_{\text{control action variation error}} + \underbrace{\left\| T_{f_{t+k,t}} + T_{rl_{t+k,t}} + T_{rr_{t+k,t}} - T_{driver_{t+k,t}}^{Ref} \right\|_{W_4}^2}_{\text{total torque error}} \quad (16)$$

where the first term represents the predicted error and the second term represents the control action variation error in the prediction horizon. If the actuator must be turned off, then $\Delta u_{max}$ is set equal to $\Delta u_{min}$. If the actuator must be fully activated, then $\Delta u_{min}$ is set equal to $\Delta u_{max}$. For example, if the vehicle body 36 is approaching oversteer (e.g., $r > r_{max}$), the supervisory control module 72 detects the oversteer through the body stability and decides to turn off the front aerodynamic actuator (i.e., the front wing 38) and fully activate the rear aerodynamic actuator (i.e., the rear wing 40). Therefore, the constraints are updated as $$\begin{cases} \Delta u_{front}^{min} \leq \Delta u_{front}^{aero} \leq \Delta u_{front}^{min} \\ \Delta u_{rear}^{max} \leq \Delta u_{rear}^{aero} \leq \Delta u_{rear}^{max} \end{cases}.$$

The primary control module 68 controls the eLSD 16, the front wing 38, and the rear wing 40 by outputting control signals to these actuators indicating their respective control actions. For example, the primary control module 68 may output control signals to the eLSD 16, the front wing 38, and the rear wing 40 indicating a requested transfer torque, a requested front wing attack angle, and a requested rear wing attack angle, respectively. The primary control module 68 may also control the engine 12, the transmission 14, and the electric motor 20 in a similar manner.

The stability status module 70 determines the stability statuses of the vehicle body 36, the front axle 33, the rear axle 35, and the wheels 26, 28, 30, 32. In other words, the stability status module 70 determines whether these components are stable (or unsaturated) or unstable (or saturated). The stability status module 70 determines the stability status of the vehicle body 36 based on the yaw rate of the vehicle 10, the longitudinal speed of the vehicle 10, and the sideslip angle of the vehicle 10 (i.e., the angle between the longitudinal axis of the vehicle 10 and the travel path of the vehicle 10). The stability status module 70 receives the yaw rate and/or the sideslip angle from the vehicle motion sensor 58. The stability status module 70 may receive the longitudinal vehicle speed from the GPS module 60 and/or determine the longitudinal vehicle speed based on the wheel speeds from the wheel speed sensors 46, 48, 50, 52.

In one example, the stability status module 70 determines that the vehicle body 36 is stable if (i) the yaw rate is within a range from a minimum yaw rate to a maximum yaw rate and (ii) the sideslip angle is within a range from a minimum sideslip angle to a maximum sideslip angle. If one or both of conditions (i) and (ii) is/are not satisfied, the stability status module 70 determines that the vehicle body 36 is unstable. The stability status module 70 may determine the maximum and minimum yaw rates using a relationship such as $$r_{\substack{max\\min}} = \pm \frac{\mu g_{z+aero}}{v_x},\quad (17)$$

where $r_{max}$ is the maximum yaw rate, $r_{min}$ is the minimum yaw rate, the positive sign (+) applies to the minimum yaw rate, the negative sign (−) applies to the minimum yaw rate, μ is the road friction coefficient, $g_{z+aero}$ is the gravitational acceleration plus the aerodynamic wings' effect, and $v_x$ is the longitudinal vehicle speed. The stability status module 70 may determine the road friction coefficient based on an image of the road captured by a camera (not shown) mounted on the vehicle body 36. The gravitational acceleration plus the aerodynamic wings' effect may be predetermined.

The stability status module 70 may determine the maximum and minimum sideslip angles using a relationship such as $$\beta_{\substack{max\\min}} = \pm \operatorname{atan}\left(\frac{3l_f \mu m g_{z+aero}}{2C_\alpha l}\right)^{-1} + \frac{l_r r}{v_x},\quad (18)$$

where $\beta_{max}$ is the maximum sideslip angle, $\beta_{min}$ is the minimum sideslip angle, the positive sign (+) applies to the maximum sideslip angle, and the negative sign (−) applies to the minimum sideslip angle.

The stability status module 70 may also determine whether the vehicle 10 is understeering or oversteering based on the sideslip angle and the steering angle. For example, the stability status module 70 may determine that the vehicle 10 is understeering when the sideslip angle indicates that the vehicle 10 is turning less than commanded by the steering angle. Conversely, the stability status module 70 may determine that the vehicle 10 is oversteering when the sideslip angle indicates that the vehicle 10 is turning more than commanded by the steering angle.

In another example, the stability status module 70 determines that the front axle 33 is stable or unsaturated if the tire slip angles of the left and right front wheels 26 and 28 are less than saturation tire slip angles. Otherwise, the stability status module 70 determines that the front axle 33 is unstable or saturated. The stability status module 70 determines that the rear axle 35 is stable or unsaturated if the tire slip angles of the left and right rear wheels 30 and 32 are less than the saturation tire slip angles. Otherwise, the stability status module 70 determines that the rear axle 35 is unstable or saturated. The stability status module 70 may determine the saturation tire slip angle for each of the wheels 26, 28, 30, 32 using a relationship such as $$\alpha_{lim} = \tan^{-1}\frac{3\mu F_z}{C_\alpha},\quad (19)$$

where $\alpha_{lim}$ is the saturation tire slip angle and $F_z$ is the tire normal load (or tire vertical force) at the corresponding one of the wheels 26, 28, 30, 32.

In another example, for each of the wheels 26, 28, 30, 32, the stability status module 70 determines that the wheel is stable if the tire slip ratio of the wheel is less than a maximum tire slip ratio (or tire stability margin). Otherwise, the stability status module 70 determines that the wheel is unstable. The maximum tire slip ratio may be predetermined. The stability status module 70 may determine the tire slip ratio of each wheel using a relationship such as $$\kappa_{ij} = \frac{R_{eff,ij}\omega_{ij} - x_{x_{ij}}}{\max(R_{eff,ij}\omega_{ij};v_{x_{ij}})},\quad (20)$$

where $\kappa_{ij}$ is the tire slip ratio of a wheel ij, $R_{eff,ij}$ is the rolling effective radius of a free-rolling tire on the wheel ij, ω is the speed (angular velocity) of the wheel ij, and $v_{x_{ij}}$ is the translational speed at the center of the wheel ij. The stability status module 70 receives the wheel speeds from the wheel speed sensors 46, 48, 50, 52. The effective tire rolling radius may be predetermined. The stability status module 70 may determine the translational speed at the center of the wheel ij using a relationship such as $$v_{x_{ij}} = \begin{cases} v_x - \dfrac{l_w r}{2}; ij = \text{inner wheel} \\ v_x - \dfrac{l_w r}{2}; ij = \text{outer wheel} \end{cases},\quad (21)$$

where $l_w$ is the track width of the vehicle 10 and r is the yaw rate of the vehicle 10.

The supervisory control module 72 receives the stability or saturation statuses of the vehicle body 36, the front and rear axles 33 and 35, and the front and rear wheels 26, 28, and 30, 32 and adjusts one or more of the control actions when at least one of these components is unstable or saturated. The supervisory control module 72 adjusts the control actions in a manner that decreases the instability. If the supervisory control module 72 adjusts the control actions, the supervisory control module 72 outputs the adjusted control actions. The control signals output by the primary control module 68 to the eLSD 16, the front wing 38, and the rear wing 40 indicate their respective control actions as adjusted by the supervisory control module 72 (if applicable). In various implementations, the supervisory control module 72 may output the control actions to these actuators instead of the primary control module 68.

Figure 3:
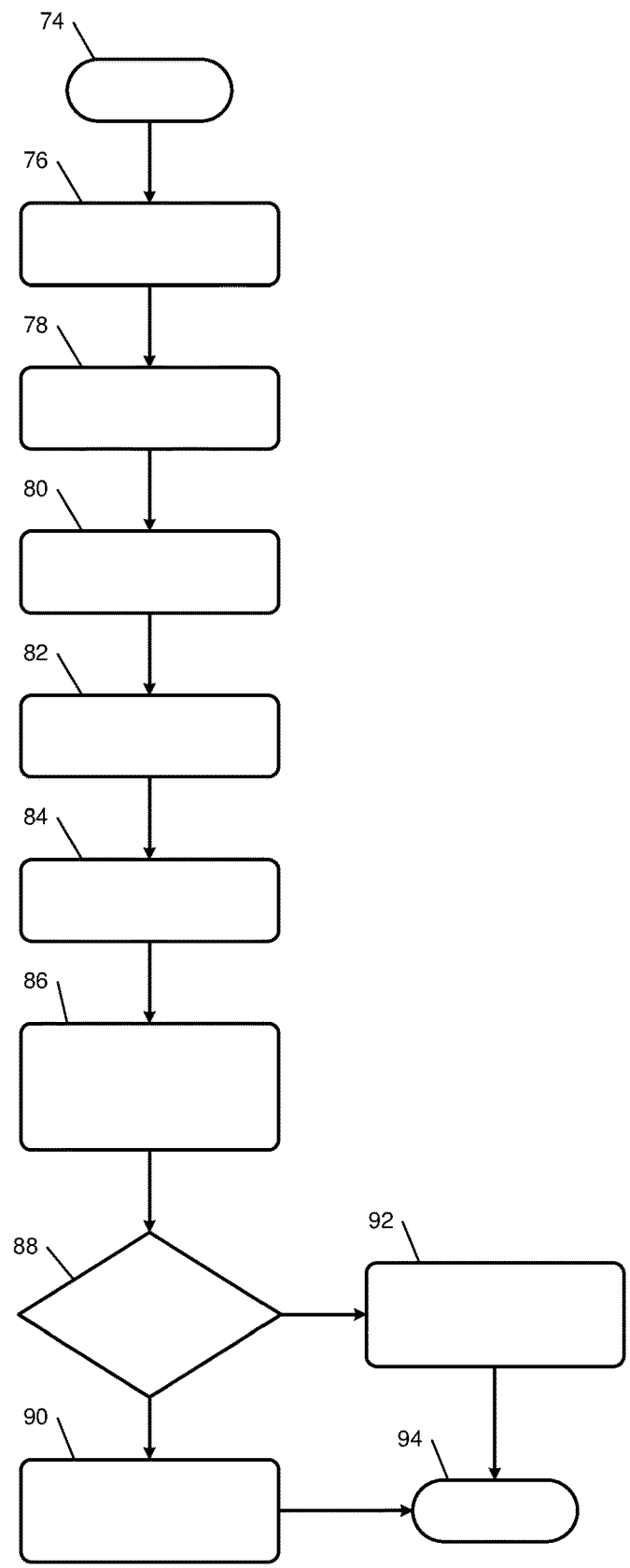
FIGS. 3 through 5 are flowcharts illustrating example methods of controlling an electronic limited slip differential and an active aerodynamic actuator according to the present disclosure.

Referring now to FIG. 3, an example method of controlling the eLSD 16 and the front and rear wings 38 and 40 begins at 74. At 76, the driver command module 64 determines the driver torque request based on the accelerator pedal position from the accelerator pedal position sensor 54. At 78, the driver command module 64 determines the steering angle based on the steering wheel position from the steering wheel position sensor 56.

At 80, the vehicle dynamics module 66 determines the desired yaw rate of the vehicle 10. At 82, the vehicle dynamics module 66 determines the desired sideslip angle of the vehicle 10. At 84, the vehicle dynamics module 66 determines desired tire forces at each of the wheels 26, 28, 30, 32. At 86, the primary control module 68 uses MPC to determine the requested amount of torque to be transferred by the eLSD 16 and the requested attack angles of the front and rear wings 38 and 40.

At 88, the stability status module 70 determines whether the vehicle body 36, the front and rear axles 33 and 35, and the front and rear wheels 26, 28 and 30, 32 are stable (or unsaturated) or unstable (or saturated). If all of these components are stable (or unsaturated), the method continues at 90. Otherwise, the method continues at 92.

At 90, the supervisory control module 72 does not adjust the requested transfer torque or the requested attack angles determined by the primary control module 68. At 92, the supervisory control module 72 adjusts the requested transfer torque and/or one or both of the requested attack angles determined by the primary control module 68. The supervisory control module 72 adjusts the requested transfer torque and/or one or both of the requested attack angles in a manner that reduces the instability of the unstable component(s). The method ends at 94.

Figure 4:
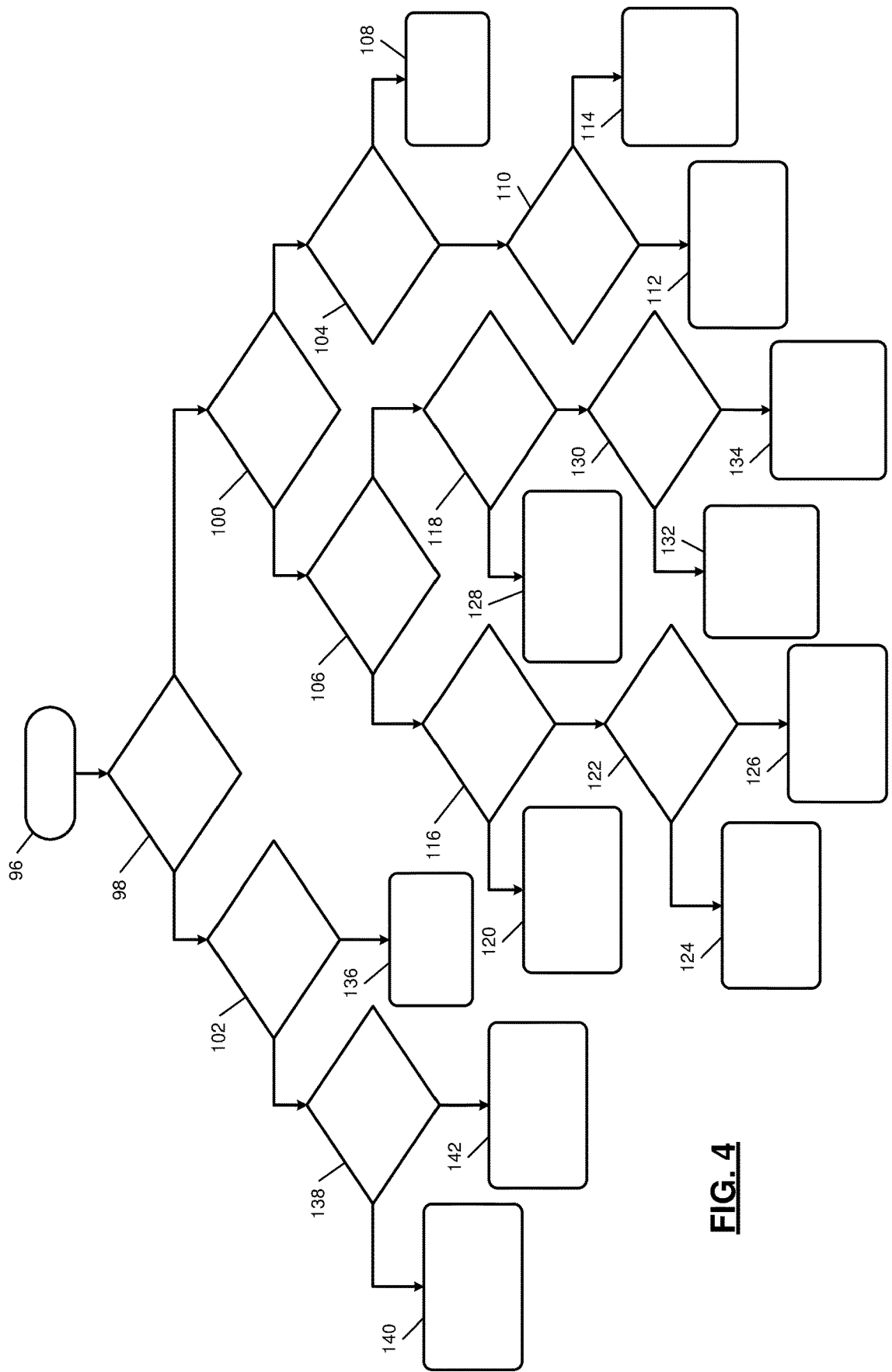

Referring now to FIG. 4, a method for adjusting the attack angles of the front and rear wings 38 and 40 based on the stability status of the vehicle body 36, the front and rear axles 33 and 35, and the front and rear wheels 26, 28 and 30, 32 beings at 96. The method of FIG. 4 is an example implementation of 88, 90, and 92 of the method of FIG. 3. At 98, the stability status module 70 determines whether the vehicle body 36 is stable. If the vehicle body 36 is stable, the method continues at 100. Otherwise, the method continues at 102.

At 100, the stability status module 70 determines whether the front and rear axles 33 and 35 are stable. If the front and rear axles 33 and 35 are stable, the method continues at 104. Otherwise, the method continues at 106. At 104, the stability status module 70 determines whether all of the wheels 26, 28, 30, 32 are stable. If all of the wheels 26, 28, 30, 32 are stable, the method continues at 108. Otherwise, the method continues at 110. At 108, the supervisory control module 72 does not adjust the attack angle of the front or rear wing 38 or 40.

At 110, the stability status module 70 determines whether one or both of the front wheels 26, 28 is/are unstable or one or both of the rear wheels 30, 32 is/are unstable. If one or both of the front wheels 26, 28 is/are unstable, the method continues at 112. If one or both of the rear wheels 30, 32 is/are unstable, the method continues at 114. At 112, the supervisory control module 72 increases the attack angle of the front wing 38 and does not adjust the attack angle of the rear wing 40. At 114, the supervisory control module 72 does not adjust the attack angle of the front wing 38 and increases the attack angle of the rear wing 40.

At 106, the stability status module 70 determines whether the front axle 33 is unstable (or saturated) or the rear axle 35 is unstable (or saturated). If the front axle 33 is unstable (or saturated), the method continues at 116. If the rear axle 35 is unstable (or saturated), the method continues at 118. At 116, the stability status module 70 determines whether all of the wheels 26, 28, 30, 32 are stable. If all of the wheels 26, 28, 30, 32 are stable, the method continues at 120. Otherwise, the method continues at 122.

At 122, the stability status module 70 determines whether one or both of the front wheels 26, 28 is/are unstable or one or both of the rear wheels 30, 32 is/are unstable. If one or both of the front wheels 26, 28 is/are unstable, the method continues at 124. If one or both of the rear wheels 30, 32 is/are unstable, the method continues at 126. At 120 and 124, the supervisory control module 72 increases the attack angle of the front wing 38 and does not adjust the attack angle of the rear wing 40. At 126, the supervisory control module 72 decreases as the attack angle of the front wing 38 and increases the attack angle of the rear wing 40.

At 102, the stability status module 70 determines whether the front and rear axles 33 and 35 are stable. If both of the front and rear axles 33 and 35 are stable, the method continues at 136. Otherwise, the method continues at 138. At 136, the stability status module 70 does not adjust the attack angle of the front wing 38 or the rear wing 40.

At 106, the stability status module 70 determines whether the front axle 33 is unstable (or saturated) or the rear axle 35 is unstable (or saturated). If the front axle 33 is unstable (or saturated), the method continues at 140. If the rear axle 35 is unstable (or saturated), the method continues at 142. At 140 and 142, the supervisory control module 72 decreases as the attack angle of the front wing 38 and increases the attack angle of the rear wing 40.

Figure 5:
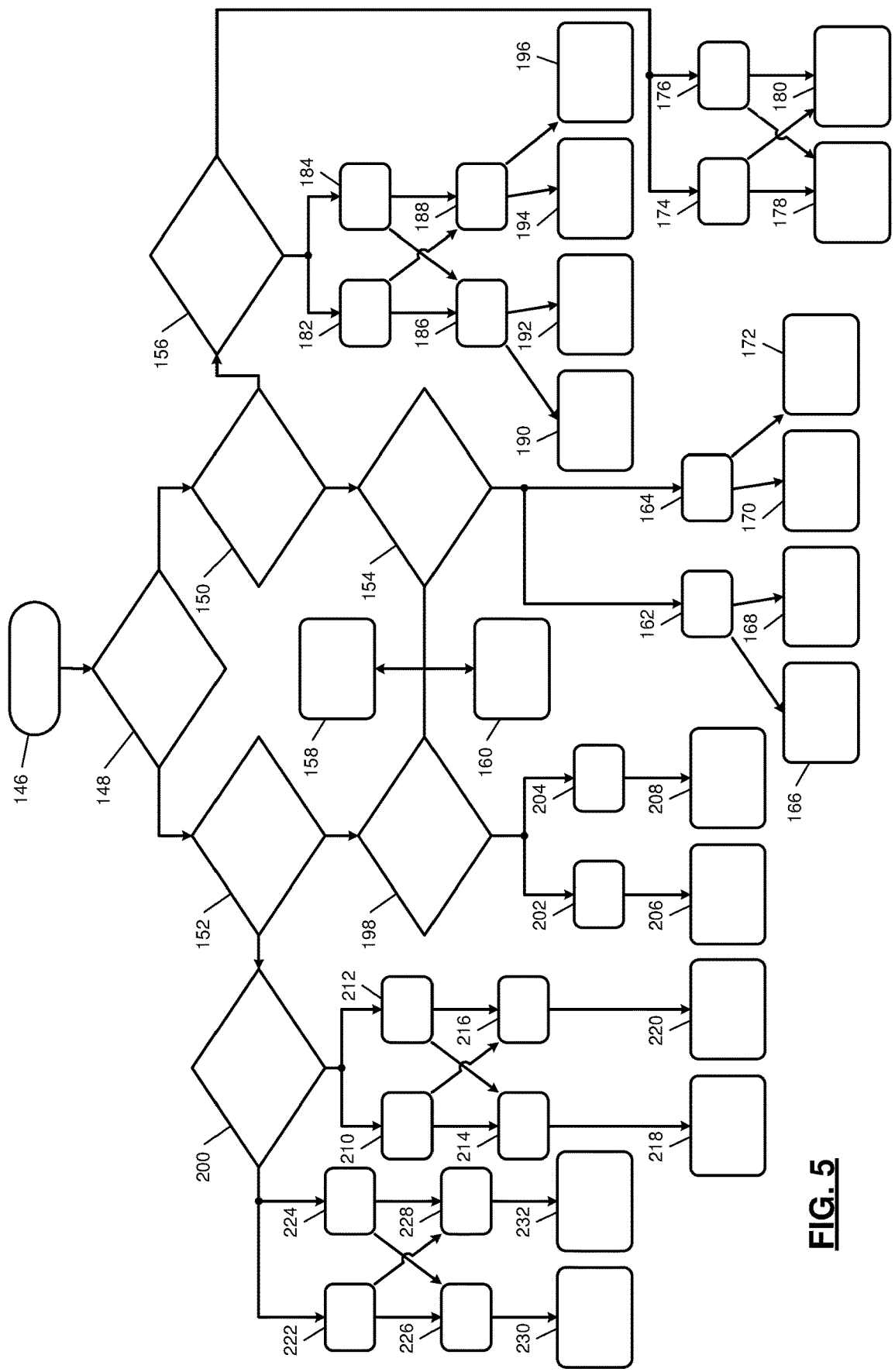

Referring now to FIG. 5, a method for controlling the eLSD 16 and the front and rear wings 38 and 40 based on the stability status of the vehicle body 36, the front and rear axles 33 and 35, and the front and rear wheels 26, 28 and 30, 32 beings at 146. The method of FIG. 4 is an example implementation of 88, 90, and 92 of the method of FIG. 3. At 148, the stability status module 70 determines whether the vehicle body 36 is stable. In addition, the stability status module 70 determines whether the vehicle 10 is understeering or oversteering. If the vehicle body 36 is stable, the method continues at 150. Otherwise, the method continues at 152.

At 150, the stability status module 70 determines whether the front and rear axles 33 and 35 are stable. If both of the front and rear axles 33 and 35 are stable, the method continues at 154. Otherwise, the method continues at 156. At 154, the stability status module 70 determines whether the wheels 26, 28, 30, 32 are stable. If all of the wheels 26, 28, 30, 32 are stable, the method continues at 158 or 160. The method continues at 158 if the vehicle 10 is understeering and an oversteer yaw moment (OYM) is required. The method continues at 160 if the vehicle 10 is oversteering and an understeer yaw moment (UYM) is required.

At 158, the supervisory control module 72 activates the front aerodynamic actuator (FAA) and deactivates the rear aerodynamic actuator (RAA) and the eLSD 16. The supervisory control module 72 may activate (e.g., turn on) the FAA by adjusting the attack angle of the front wing 38 to generate a downward force on the front wheels 26, 28. The supervisory control module 72 may deactivate (e.g., turn off) the RAA by adjusting the attack angle of the rear wing 40 to not generate a downward force on the rear wheels 30, 32. The supervisory control module 72 may deactivate the eLSD 16 by releasing the clutch 34 so that the eLSD 16 does not transfer torque from the left rear wheel 30 to the right rear wheel 32 or vice versa.

At 160, the supervisory control module 72 deactivates the FAA and activates the RAA and the eLSD 16. The supervisory control module 72 may deactivate the FAA by adjusting the attack angle of the front wing 38 to not generate a downward force on the front wheels 26, 28. The supervisory control module 72 may activate the RAA by adjusting the attack angle of the rear wing 40 to generate a downward force on the rear wheels 30, 32. The supervisory control module 72 may deactivate the eLSD 16 by applying the clutch 34 so that the eLSD 16 transfer torques from the left rear wheel 30 to the right rear wheel 32 or vice versa.

If the any of the wheels 26, 28, 30, 32 is/are unstable at 154, the method continues at 162 or 164. The method continues at 162 if the inner wheel speed of the vehicle 10 is greater than the outer wheel speed of the vehicle 10 as the vehicle 10 is yawing. The method continues at 164 if the outer wheel speed of the vehicle 10 is greater than the inner wheel speed of the vehicle 10 as the vehicle 10 is yawing.

From 162, the method continues at 166 or 168. The method continues at 166 if the vehicle 10 is oversteering and an UYM is required. At 166, the supervisory control module 72 deactivates the FAA and the eLSD 16 and activates the RAA. The method continues at 168 if the vehicle 10 is understeering and an OYM is required. At 168, the supervisory control module 72 activates the FAA and the eLSD 16 and deactivates the RAA.

From 164, the method continues at 170 or 172. The method continues at 170 if the vehicle 10 is oversteering and an UYM is required. At 170, the supervisory control module 72 deactivates the FAA and activates the RAA and the eLSD 16. The method continues at 172 if the vehicle 10 is understeering and an OYM is required. At 172, the supervisory control module 72 activates the FAA and deactivates the RAA and the eLSD 16.

At 156, the stability status module 70 determines whether the wheels 26, 28, 30, 32 are stable. If all of the wheels 26, 28, 30, 32 are stable, the method continues at 174 or 176. The method continues at 174 if the rear axle 35 is unstable (or saturated). The method continues at 176 if the front axle 33 is unstable (or saturated). From 174 and 176, the method continues at 178 or 180.

The method continues at 178 from 174 if the vehicle 10 is understeering and an OYM is required. The method continues at 180 from 174 if the vehicle 10 is oversteering and an UYM is required. The method continues at 178 from 176 if the vehicle 10 is understeering and an OYM is required. The method continues at 180 from 176 if the vehicle 10 is oversteering and an UYM is required. At 178, the supervisory control module 72 activates the FAA and deactivates the RAA and the eLSD 16. At 180, the supervisory control module 72 deactivates the FAA and activates the RAA and the eLSD 16.

If any of the wheels 26, 28, 30, 32 is/are unstable at 156, the method continues at 182 or 184. From 182 and 184, the method continues at 186 or 188. The method continues at 182 and 186 if the inner wheel speed of the rear axle 35 is greater than the outer wheel speed of the rear axle 35. The method continues at 182 and 188 if the outer wheel speed of the rear axle 35 is greater than the inner wheel speed of the rear axle 35. The method continues at 184 and 186 if the inner wheel speed of the front axle 33 is greater than the outer wheel speed of the front axle 33. The method continues at 184 and 188 if the outer wheel speed of the front axle 33 is greater than the inner wheel speed up the front axle 33.

From 186, the method continues at 190 or 192. The method continues at 190 if the vehicle 10 is oversteering and UYM is required. At 190, the supervisory control module 72 deactivates FAA and eLSD 16 and RAA. The method continues at 192 if the vehicle 10 is understeering and a light is required. At 192, the supervisory control module 72 activates FAA and eLSD 16 and deactivates RAA.

From 188, the method continues at 194 or 196. The method continues at 194 if the vehicle 10 is oversteering and UYM is required. At 194, the supervisory control module deactivates FAA and activates RAA and eLSD 16. The method continues at 196 if the vehicle 10 is understeering and OYM is required. At 196, the supervisory control module 172 activates FAA and deactivate RAA and eLSD 16.

At 152, the stability status module 70 determines whether the front and rear axles 33 and 35 are stable. If both of the front and rear axles 33 and 35 are stable, the method continues at 198. Otherwise, the method continues at 200. At 198, the stability status module 70 determines whether the wheels 26, 28, 30, 32 are stable. If all of the wheels 26, 28, 30, 32 are stable, the method continues at 158 or 160. The method continues at 158 if the vehicle 10 is understeering and an OYM is required. The method continues at 160 if the vehicle 10 is oversteering and an UYM is required.

If the any of the wheels 26, 28, 30, 32 is/are unstable at 198, the method continues at 202 and 206 or 204 and 208. The method continues at 202 and 206 if the inner wheel speed of the vehicle 10 is greater than the outer wheel speed of the vehicle 10 as the vehicle 10 is yawing. At 206, the supervisory control module 72 deactivates the FAA and the eLSD 16 and activates the RAA. The method continues at 204 and 208 if the outer wheel speed of the vehicle 10 is greater than the inner wheel speed of the vehicle 10 as the vehicle 10 is yawing. At 208, the supervisory control module deactivates the FAA and activates the RAA and eLSD 16.

At 200, the stability status module 70 determines whether the wheels 26, 28, 30, 32 are stable. If all of the wheels 26, 28, 30, 32 are stable, the method continues at 210 or 212. From 210 and 212, the method continues at 214 or 216. The method continues at 210 and 214 if the inner wheel speed of the rear axle 35 is greater than the outer wheel speed of the rear axle 35. The method continues at 210 and 216 if the outer wheel speed of the rear axle 35 is greater than the inner wheel speed of the rear axle 35. The method continues at 212 and 214 if the inner wheel speeds of both the front and rear axles 33 and 35 is greater than the outer wheel speeds of the front and rear axles 33 and 35, respectively. The method continues at 212 and 216 if the inner wheel speeds of both the front and rear axles 33 and 35 is greater than the outer wheel speeds of the front and rear axles 33 and 35, respectively.

From 202, the method continues at 206. At 206, the supervisory control module 72 deactivates the FAA and the eLSD 16 and activates the RAA. From 204, the method continues at 208. At 208, the supervisory control module 72 deactivates the FAA and activates the RAA at the eLSD 16.

If any of the wheels 26, 28, 30, 32 is/are unstable at 200, the method continues at 222 or 224. From 222 and 224, the method continues at 226 or 228. The method continues at 222 and 226 if the inner wheel speed of the rear axle 35 is greater than the outer wheel speed of the rear axle 35. The method continues at 222 and 228 if the outer wheel speed of the rear axle 35 is greater than the inner wheel speed of the rear axle 35. The method continues at 224 and 226 if the inner wheel speeds of both the front and rear axles 33 and 35 is greater than the outer wheel speeds of the front and rear axles 33 and 35, respectively. The method continues at 224 and 228 if the inner wheel speeds of both the front and rear axles 33 and 35 is greater than the outer wheel speeds of the front and rear axles 33 and 35, respectively.

From 226, the method continues at 230. At 230, the supervisory control module 72 deactivates the FAA and the eLSD 16 and activates the RAA. From 228, the method continues at 232. At 232, the supervisory control module 72 deactivates the FAA and activates the RAA at the eLSD 16.

Figure 6:
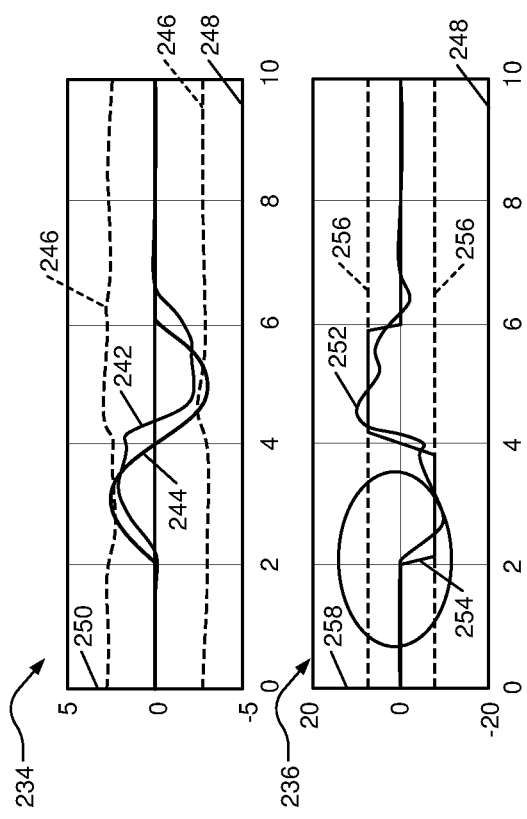
FIGS. 6 through 8 are graphs illustrating example driver commands, vehicle dynamics states, and control actions for an active aerodynamic actuator according to the present disclosure.
Figure 6:
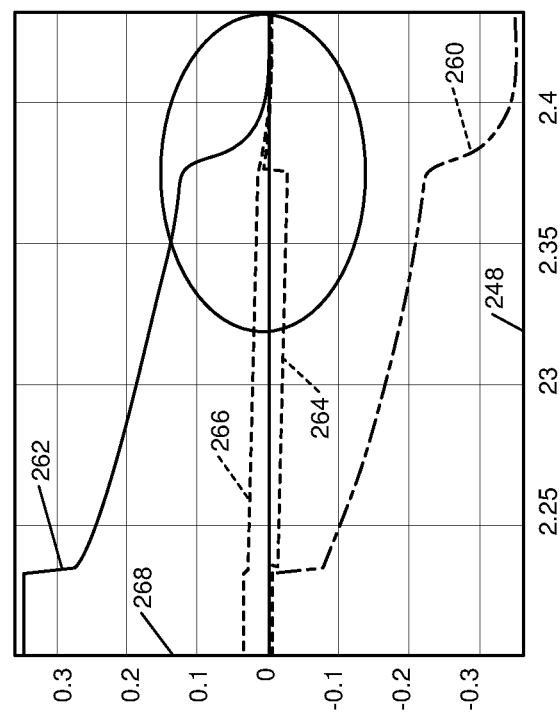
Figure 6:
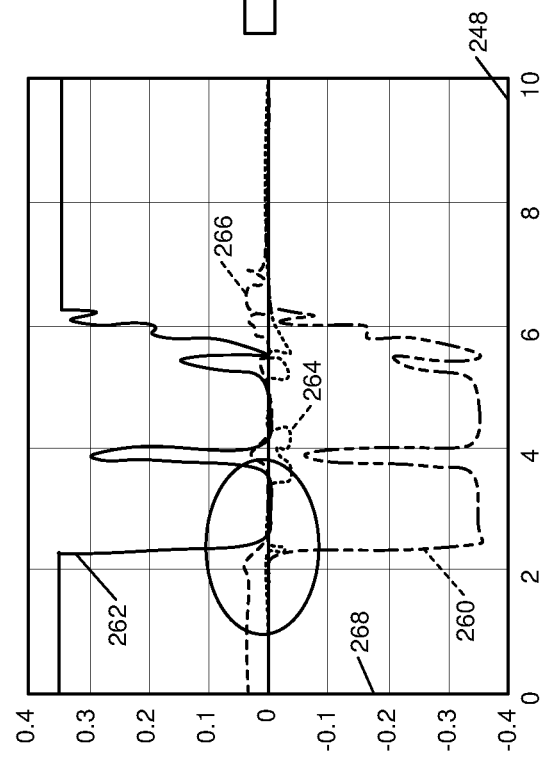

Referring now to FIG. 6, a graph 234, a graph 236, a graph 238, and a graph 240 illustrate an example of how the supervisory control module 72 may adjust the control actions by updating the input rate constraint in real-time. As discussed above, the primary control module 68 may determine the control actions using MPC, in which case the primary control module 68 may limit the rate at which it adjusts the aerodynamic actuators based on the input rate constraint.

In the graph 234, a measured sideslip angle 242, a desired sideslip angle 244, and a sideslip angle limit 246 are plotted with respect to an x-axis 248 that represents time in seconds and a y-axis 250 that represents sideslip angle in degrees. In the graph 236, a measured yaw rate 252, a desired yaw rate 254, and a yaw rate limit 256 are plotted with respect to the x-axis 248 and a y-axis 258 that represents yaw rate in degrees per second (deg/s).

In the graph 238, a minimum input value 260, a maximum input value 262, a minimum input change rate 264, and a maximum input change rate 266 are plotted with respect to the x-axis 248 and a y-axis 268 that represents the rear aerodynamic actuator constraint in radians. The graph 240 is simply an enlargement of a portion of the graph 238. The minimum and maximum input values 260 and 262 are the minimum and maximum values to which the attack angle of the rear wing 40 may be set. The minimum and maximum input change rates 264 and 266 and the minimum and maximum rates by which the attack angle of the rear wing 40 may be changed in one control loop.

As shown in the graph 234, at a time of 2.375 sections, the measured yaw rate 252 crosses the yaw rate limit 256 (in this case, the minimum yaw rate). Therefore, the stability status module 70 determines that the vehicle body 36 is unstable in accordance with relationship (1) above. In turn, the supervisory control module 72 fully activates the rear wing 40 by clipping the minimum and maximum input change rates 264 and 266 to the maximum value of the input variation.

Figure 7:
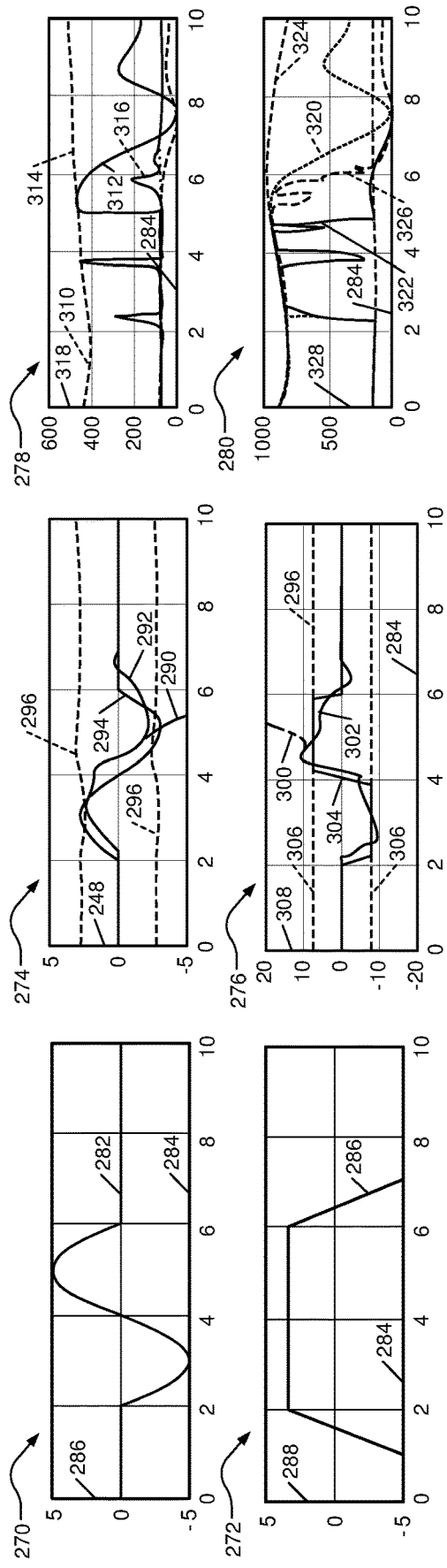

Referring now to FIG. 7, a graph 270, a graph 272, a graph 274, a graph 276, a graph 278, and a graph 280 illustrate another example where the supervisory control module 72 adjusts the control actions. In the graph 270, a steering angle 282 of the vehicle 10 is plotted with respect to an x-axis 284 that represents time in seconds and a y-axis 286 that represents steering angle in radians. In the graph 272, a driver torque request 286 is plotted with respect to the x-axis 284 and a y-axis 288 that represents torque in Newton meters (Nm).

In the graph 274, a supervisory OFF sideslip angle 290, a supervisory ON sideslip angle 292, a desired sideslip angle 294, and a sideslip angle limit 296 are plotted with respect to the x-axis 284 and a y-axis 298 that represents slip angle in degrees. The supervisory OFF sideslip angle 290 is the measured sideslip angle of the vehicle 10 when the supervisory control module 72 is disabled. The supervisory ON sideslip angle 292 is the measured sideslip angle of the vehicle 10 when the supervisory control module 72 is enabled.

In the graph 276, a supervisory OFF yaw rate 300, a supervisory ON yaw rate 302, a desired yaw rate 304, and a yaw rate limit 306 are plotted with respect to the x-axis 284 and a y-axis 308 that represents yaw rate in deg/s. The supervisory OFF yaw rate 300 is the measured yaw rate of the vehicle 10 when the supervisory control module 72 is disabled. The supervisory ON yaw rate 302 is the measured yaw rate of the vehicle 10 when the supervisory control module 72 is enabled.

In the graph 278, a supervisory OFF front vertical force limit 310, a supervisory OFF front vertical force 312, a supervisory ON front vertical force limit 314, and a supervisory ON front vertical force 316 are plotted with respect to the x-axis 284 and a y-axis 318 that represents force in Newtons (N). The supervisory OFF and supervisory ON front vertical force limits 310 and 314 are limits on the downward force generated by the front wing 38 when the supervisory control module 72 is disabled and enabled, respectively. The supervisory OFF and supervisory ON front vertical forces 312 and 316 are estimated downward forces generated by the front wing 38 when the supervisory control module 72 is disabled and enabled, respectively.

In the graph 280, a supervisory OFF rear vertical force limit 320, a supervisory OFF rear vertical force 322, a supervisory ON rear vertical force limit 324, and a supervisory ON rear vertical force 326 are plotted with respect to the x-axis 284 and a y-axis 328 that represents force in N. The supervisory OFF and supervisory ON rear vertical force limits 320 and 324 are limits on the downward force generated by the rear wing 40 when the supervisory control module 72 is disabled. The supervisory OFF and supervisory ON rear vertical forces 322 and 326 are estimated downward forces generated by the rear wing 40 when the supervisory control module 72 is disabled and enabled, respectively.

In this example, the vehicle 10 is traveling on a wet road and the initial speed of the vehicle 10 is 150 kilometers per hour (kph). In addition, the prediction model used by the primary control module 68 in conjunction with MPC when determining the control actions is accurate. At a time of 2 seconds, the driver commands a steering maneuver while accelerating the vehicle 10. At a time of 4.2 seconds, the vehicle body 36 becomes unstable, as evidenced by the supervisory OFF and ON yaw rates 300 and 302 and crossing the yaw rate limit 306.

At a time of 4.9 seconds, the primary control module 68 attempts to deactivate the rear wing 40 to prevent the understeering that made the vehicle 10 unstable. However, at that time, the supervisory control module 72 keeps the rear wing 40 active to stabilize the rear tires. In this example, the instability in the rear tires is caused by a high slip ratio, and deactivating the rear wing 40 would not eliminate the instability. The primary control module 68 does not recognize this even though the prediction model is accurate. However, the supervisory control module 72 does recognize this and therefore clips the constraint rates to maximum values to force the primary control module 68 to keep the attack angle of attack of the rear wing 40 at its maximum value.

Figure 8:
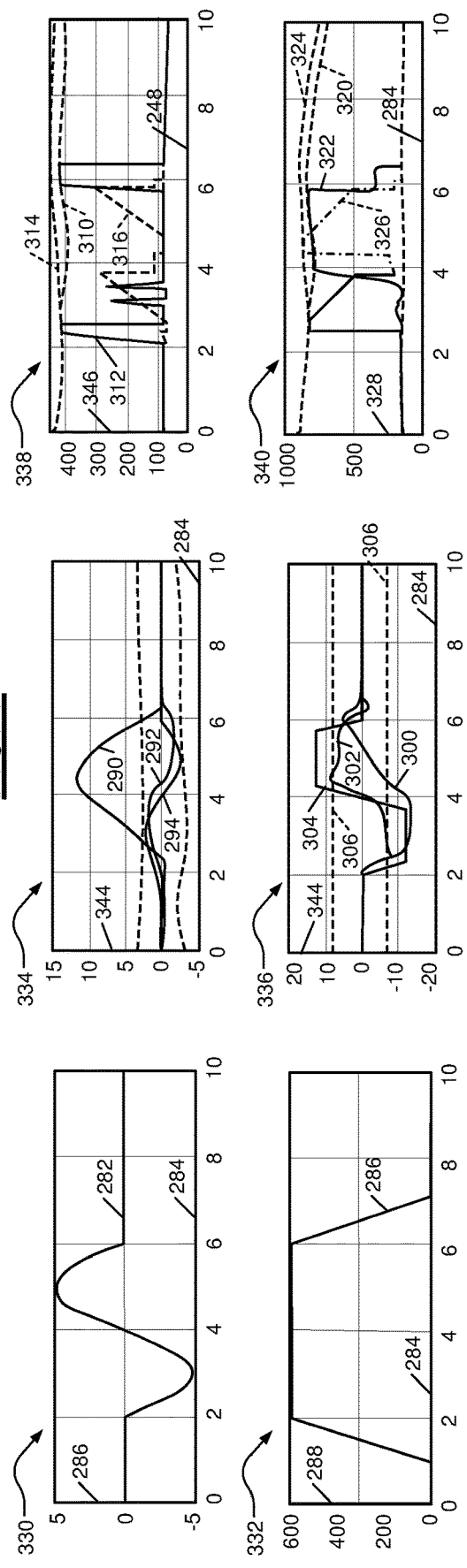

Referring now to FIG. 8, a graph 330, a graph 332, a graph 334, a graph 336, a graph 338, and a graph 340 illustrate another example where the supervisory control module 72 adjusts the control actions. In the graph 330, the steering angle 282 of the vehicle 10 is plotted with respect to the x-axis 284 and the y-axis 286. In the graph 332, the driver torque request 286 is plotted with respect to the x-axis 284 and a y-axis 342 that represents torque in Nm. In the graph 334, the supervisory OFF sideslip angle 290, the supervisory ON sideslip angle 292, the desired sideslip angle 294, and the sideslip angle limit 296 are plotted with respect to the x-axis 284 and a y-axis 344 that represents slip angle in degrees.

In the graph 336, the supervisory OFF yaw rate 300, the supervisory ON yaw rate 302, the desired yaw rate 304, and the yaw rate limit 306 are plotted with respect to the x-axis 284 and the y-axis 308. In the graph 338, the supervisory OFF front vertical force limit 310, the supervisory OFF front vertical force 312, the supervisory ON front vertical force limit 314, and the supervisory ON front vertical force 316 are plotted with respect to the x-axis 284 and a y-axis 346 that represents force in N. In the graph 340, the supervisory OFF rear vertical force limit 320, the supervisory OFF rear vertical force 322, the supervisory ON rear vertical force limit 324, and the supervisory ON rear vertical force 326 are plotted with respect to the x-axis 284 and the y-axis 328.

In this example, like the last example, the vehicle 10 is traveling on a wet road. However, the road surface friction coefficient is estimated as 0.85, and the prediction model used by the primary control module 68 in conjunction with MPC when determining the control actions is not accurate enough. As with the last example, at a time of 2 seconds, the driver commands a steering maneuver while accelerating the vehicle 10.

At a time of 2.3 seconds, the vehicle body 36 becomes unstable, as evidenced by the supervisory OFF and ON yaw rates 300 and 302 crossing the yaw rate limit 306. The supervisory control module 72 recognizes that the vehicle 10 is going outside of the stability boundaries and adjusts the attack angles of the front and rear wings 38 and 40 to keep the vehicle 10 within the stability boundaries (i.e., the sideslip angle limit 296 and the yaw rate limit 306). In this manner, the supervisory control module 72 compensates for estimation errors that occur when generating the control actions using MPC and corrects the control actions when the prediction model used in conjunction with MPC is not accurate.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
a primary control module configured to determine at least one control action for at least one of an electronic limited slip differential and an aerodynamic actuator of a vehicle based on a driver command;
a desired vehicle dynamics module configured to determine a desired value of a vehicle dynamics characteristic based on the driver command,
wherein the primary control module is configured to determine the at least one control action based on the desired value of the vehicle dynamics characteristic using a vehicle dynamics model;
a stability status module configured to determine whether at least one component of the vehicle is stable or unstable based on an input from a sensor on the vehicle, the at least one component including at least one of a vehicle body, a front axle, a rear axle, front wheels, and rear wheels; and
a supervisory control module configured to adjust the at least one control action when the at least one component is unstable.

2. The system of claim 1 wherein:
the aerodynamic actuator includes a front wing attached to the vehicle body adjacent to a front end of the vehicle and a rear wing attached to the vehicle body adjacent to a rear end of the vehicle;
the at least one control action includes a desired attack angle of the front wing and a desired attack angle of the rear wing; and
the supervisory control module is configured to:
adjust the desired attack angle of at least one of the front and rear wings when at least one of the vehicle body, the front and rear axles, and the front and rear wheels is unstable; and
not adjust the desired attack angle of either one of the front and rear wings when the vehicle body, the front and rear axles, and the front and rear wheels are stable.

3. The system of claim 2 wherein the supervisory control module is configured to increase the desired attack angle of the front wing to increase a downward force on the front wheels of the vehicle, and not adjust the desired attack angle of the rear wing, when any one of the following conditions is satisfied:
the vehicle body is stable, the front axle is unstable, and the front and rear wheels are stable;
the vehicle body is stable, the front axle is unstable, and the front wheels are unstable; and
the vehicle body is stable, the front and rear axles are stable, and the front wheels are unstable.

4. The system of claim 2 wherein the supervisory control module is configured to not adjust the desired attack angle of the front wing, and increase the desired attack angle of the rear wing to increase a downward force on the rear wheels of the vehicle, when any one of the following conditions is satisfied:
the vehicle body is stable, the rear axle is unstable, and the front and rear wheels are stable;
the vehicle body is stable, the rear axle is unstable, and the rear wheels are unstable; and
the vehicle body is stable, the front and rear axles are stable, and the rear wheels are unstable.

5. The system of claim 2 wherein the supervisory control module is configured to decrease the desired attack angle of the front wing to decrease a downward force on the front wheels of the vehicle, and increase the desired attack angle of the rear wing to increase a downward force on the rear wheels of the vehicle, when any one of the following conditions is satisfied:
the vehicle body is unstable;
the vehicle body is stable, the front axle is unstable, and the rear wheels are unstable; and
the vehicle body is stable, the rear axle is unstable, and the front wheels are unstable.

6. The system of claim 1 wherein:
the at least one control action includes whether to activate the electronic limited slip differential to transfer torque from one of the rear wheels to the other one of the rear wheels; and
the supervisory control module is configured to one of activate and deactivate the electronic limited slip differential based on whether the vehicle body, the front and rear axles, and the front and rear wheels are stable.

7. The system of claim 6 wherein:
the at least one control action further includes whether to activate a front wing to generate a downward force on the front wheels of the vehicle and whether to activate a rear wing to generate a downward force on the rear wheels of the vehicle; and
the supervisory control module is configured to one of activate and deactivate the front and rear wings based on whether the vehicle body, the front and rear axles, and the front and rear wheels are stable.

8. The system of claim 7 wherein the supervisory control module is configured to deactivate the front wing and the electronic limited slip differential and activate the rear wing when any one of the following conditions is satisfied:
the vehicle body is stable and oversteering, the front and rear axles are stable, at least one of the front and rear wheels is unstable, and an inner wheel speed of is greater than an outer wheel speed of the vehicle;
the vehicle body is stable and oversteering, at least one of the front and rear axles is unstable, and the inner wheel speed of the rear axle is greater than the outer wheel speed of the rear axle;
the vehicle body is unstable, the front and rear axles are stable, at least one of the front and rear wheels is unstable, and the inner wheel speed of the vehicle is greater than the outer wheel speed of the vehicle;
the vehicle body is unstable and oversteering, at least one of the front and rear axles is unstable, and the inner wheel speed of the rear axle is greater than the outer wheel speed of the rear axle;

the vehicle body is unstable and oversteering, at least one of the front and rear axles is unstable, and the inner wheel speeds of the front and rear axles are greater than the outer wheel speeds of the front and rear axles, respectively; and the vehicle body is unstable and oversteering, at least one of the front and rear axles is unstable, and the inner wheel speed of one of the front and rear axles is greater than the outer wheel speed of the same one of the front and rear axles.

9. The system of claim 7 wherein the supervisory control module is configured to activate the front wing and the electronic limited slip differential and deactivate the rear wing when any one of the following conditions is satisfied:

the vehicle body is stable and understeering, the front and rear axles are stable, and an inner wheel speed of one of the front and rear axles is greater than an outer wheel speed of the same one of the front and rear axles; and the vehicle body is stable and understeering, at least one of the front and rear axles is unstable, and the inner wheel speed of the rear axle is greater than the outer wheel speed of the rear axle.

10. The system of claim 7 wherein the supervisory control module is configured to deactivate the front wing and activate the rear wing and the electronic limited slip differential when any one of the following conditions is satisfied:

the vehicle body is stable and oversteering, the front and rear axles are stable, and the front and rear wheels are stable;

the vehicle body is stable and oversteering, the front and rear axles are stable, at least one of the front and rear wheels is unstable, and an outer wheel speed of the vehicle is greater than an inner wheel speed of the vehicle;

the vehicle body is stable and oversteering, at least one of the front and rear axles is unstable, and the outer wheel speed of one of the front and rear axles is greater than the inner wheel speed of the same one of the front and rear axles;

the vehicle body is stable and oversteering, the rear axle is unstable, and the front and rear wheels are stable; and the vehicle body is unstable and oversteering, at least one of the front and rear axles is unstable, and the outer wheel speed of one of the front and rear axles is greater than the inner wheel speed of the same one of the front and rear axles.

11. The system of claim 7 wherein the supervisory control module is configured to activate the front wing and deactivate the rear wing and the electronic limited slip differential when any one of the following conditions is satisfied:

the vehicle body is stable and understeering, the front and rear axles are stable, and the front and rear wheels are stable;

the vehicle body is stable and understeering, the front and rear axles are stable, at least one of the front and rear wheels is unstable, and an outer wheel speed of the vehicle is greater than an inner wheel speed of the vehicle;

the vehicle body is stable and understeering, at least one of the front and rear axles is unstable, and the outer wheel speed of one of the front and rear axles is greater than the inner wheel speed of the same one of the front and rear axles; and the vehicle body is stable and understeering, the front axle is unstable, and the front and rear wheels are stable.

12. The system of claim 1 wherein:

the stability status module is configured to determine whether the vehicle body is stable based on a yaw rate of the vehicle, a sideslip angle of the vehicle, and a longitudinal speed of the vehicle; and the supervisory control module is configured to adjust the at least one control action when the vehicle body is unstable.

13. The system of claim 1 wherein:

the stability status module is configured to determine whether the front and rear axles are stable based on tire sideslip angles of the front and rear wheels; and the supervisory control module is configured to adjust the at least one control action when the at least one of the front and rear axles is unstable.

14. The system of claim 1 wherein:

the stability status module is configured to determine whether the front and rear wheels are stable based on tire slip ratios of the front and rear wheels; and the supervisory control module is configured to adjust the at least one control action when the at least one of the front and rear wheels is unstable.

15. The system of claim 1 wherein the primary control module is configured to:

predict an actual value of the vehicle dynamics characteristic corresponding to possible values of the at least one control action using the vehicle dynamics model;

determine a cost associated with each of the possible values based on a difference between the predicted and desired values of the vehicle dynamics characteristic; and set the control action equal to the one of the possible values with the lowest cost out of all of the possible values.

16. A system comprising:

a desired vehicle dynamics module configured to determine a desired value of a vehicle dynamics characteristic based on a driver command;

a primary control module configured to determine control actions for an electronic limited slip differential, a front wing, and a rear wing based on the desired value of the vehicle dynamics characteristic using a vehicle dynamics model;

a stability status module configured to determine whether a vehicle body, a front axle, a rear axle, front wheels, and rear wheels are stable based on an input from a sensor on the vehicle; and a supervisory control module configured to adjust at least one the control actions when at least one of the front axle, the rear axle, the front wheels, and the rear wheels is unstable.

17. The system of claim 16 wherein:

the control actions include whether to activate the electronic limited slip differential to transfer torque from one of the rear wheels to the other one of the rear wheels, whether to activate the front wing to generate a downward force on the front wheels of the vehicle, and whether to activate the rear wing to generate a downward force on the rear wheels of the vehicle; and the supervisory control module is configured to one of activate and deactivate the electronic limited slip differential and the front and rear wings based on whether the vehicle body, the front and rear axles, and the front and rear wheels are stable.

18. The system of claim 16 wherein:

the stability status module is configured to:

determine whether the vehicle body is stable based on a yaw rate of the vehicle, a sideslip angle of the vehicle, and a longitudinal speed of the vehicle;

determine whether the front and rear axles are stable based on tire sideslip angles of the front and rear wheels; and determine whether the front and rear wheels are stable based on tire slip ratios of the front and rear wheels; and the supervisory control module is configured to adjust the at least one control action when at least one of the vehicle body, the front and rear axles, and the front and rear wheels is unstable.

19. The system of claim 16 wherein the primary control module is configured to:

predict an actual value of the vehicle dynamics characteristic corresponding to possible values of each of the control actions using the vehicle dynamics model;

determine a cost associated with each of the possible values based on a difference between the predicted and desired values of the vehicle dynamics characteristic; and set the control actions equal to the set of the possible values with the lowest cost out of all sets of the possible values.

20. A system comprising:

a primary control module configured to determine at least one control action for at least one of an electronic limited slip differential and an aerodynamic actuator of a vehicle based on a driver command;

a stability status module configured to determine whether at least one component of the vehicle is stable or unstable based on an input from a sensor on the vehicle, the at least one component including at least one of a vehicle body, a front axle, a rear axle, front wheels, and rear wheels; and a supervisory control module configured to adjust the at least one control action when the at least one component is unstable, wherein:

the at least one control action includes whether to activate the electronic limited slip differential to transfer torque from one of the rear wheels to the other one of the rear wheels; and the supervisory control module is configured to one of activate and deactivate the electronic limited slip differential based on whether the vehicle body, the front and rear axles, and the front and rear wheels are stable, the at least one control action further includes whether to activate a front wing to generate a downward force on the front wheels of the vehicle and whether to activate a rear wing to generate a downward force on the rear wheels of the vehicle; and the supervisory control module is configured to one of activate and deactivate the front and rear wings based on whether the vehicle body, the front and rear axles, and the front and rear wheels are stable.

* * * * *